RECLOSABLE PACKAGE

Original Filed March 31, 1965 2 Sheets-Sheet 1

INVENTOR
HARMON B. MILLER

BY Cushman, Darby & Cushman
ATTORNEYS

RECLOSABLE PACKAGE

Original Filed March 31, 1965 2 Sheets-Sheet 2

INVENTOR
HARMON B. MILLER

BY Cushman, Darby & Cushman
ATTORNEYS

United States Patent Office

Re. 27,361
Reissued May 9, 1972

27,361
RECLOSABLE PACKAGE

Harmon B. Miller, 1095 W. Conway Drive NW., Atlanta, Ga. 30327

Original No. 3,272,422, dated Sept. 13, 1966, Ser. No. 444,271, Mar. 31, 1965. Application for reissue Mar. 6, 1970, Ser. No. 17,351
Int. Cl. B65d *43/02*
U.S. Cl. 229—43 7 Claims

Matter enclosed in heavy brackets [ ] appears in the original patent but forms no part of this reissue specification; matter printed in italics indicates the additions made by reissue.

*ABSTRACT OF THE DISCLOSURE*

*The disclosure embraces a package having a reclosable lid which is releasably secured to the body of the package by a pressure sensitive adhesive; a peelable film is interposed between the package and the pressure sensitive adhesive.*

The present invention relates to an improvement in a reclosable package and more particularly to a package having a reclosable lid releasably secured to the body of the package by a pressure sensitive adhesive.

The principal object of the present invention is to provide a package having a lid member which is secured to the body of the package by a pressure sensitive adhesive, but in which the pressure sensitive adhesive is initially not exposed so as to interfere with filling and closing of the package.

This object can be better understood by consideration of one type of package for which the present improvement is useful, i.e. packages which comprise a preformed cup or receptacle of transparent plastic sheet material such as Saran or polyethylene, and a lid. A package of this type is shown herein in FIGURE 2 and comprises a bottom and sides. There is a flange extending laterally outwardly from the sides, and a substantially flat lid rests against the flange to close the package.

In order for the package to be used for perishable foods, it is preferable for the lid to be hermetically sealed to the flange. However, for the convenience of the consumer, it is desirable that the lid be easily removable and replaceable in the event that only part of the contents of the package are to be removed at one time.

Pressure sensitive adhesives are available which are capable of providing this kind of seal. A pressure sensitive adhesive is ordinarily employed as a coating or mass on a backing material and is normally tacky. It will stick to most surfaces but may be peeled off non-fibrous surfaces easily without leaving any residue on the surface. The adhesive mass is more strongly bonded to the backing material and is not separated from it when it is peeled off the non-fibrous surface.

It will be appreciated therefore that a pressure sensitive layer on a lid would permit the package to be closed, reopened and reclosed as many times as desired by the consumer. However, this type of adhesive has the disadvantage that the ease with which it sticks to most surfaces can be inconvenient when the package is initially filled and closed by a manufacturer or packer. Automated packaging machinery operating at high speed can more readily handle packaging materials which have no tendency to stick to each other or the equipment used to process them. For example, in a stack of lids of the type described above, it would be undesirable for the individual lids to tend to stick to each other as they would if they were coated with pressure sensitive adhesive. It is possible to apply a coating to the back of the lids, i.e.

a backsize coating of the type used on pressure sensitive adhesive tape, which will prevent forming a permanent bond between the lids. However, the lids would nevertheless stick to each other in the same manner as the successive layers on a roll of pressure sensitive tape, and would have to be pulled apart as they are used. In the case of vacuum packaging, the lid could not be placed on the package prior to evacuation because it would stick and would not lift off the package to permit outflow of air.

Accordingly, there is a need for a pressure sensitive adhesive seal for packages which is rendered inoperative while the package is being filled and closed initially, prior to sale. This object is achieved by the present invention in which a pressure sensitive adhesive is used on a package lid (or other package closing member), but it is initially covered by a peelable film member. When the package is closed, the peelable member is permanently sealed (e.g. heat sealed) to the package. Thereafter, when the lid is removed by the purchaser, the pressure sensitive adhesive on the lid lifts away from the peelable film. The lid can be resealed easily by lightly pressing the adhesive against the peelable film, and it can be reopened and closed repeatedly in the same manner.

The invention will be better understood by consideration of the following detailed description of preferred embodiments, reference being made to the drawing, in which.

Figure 1:
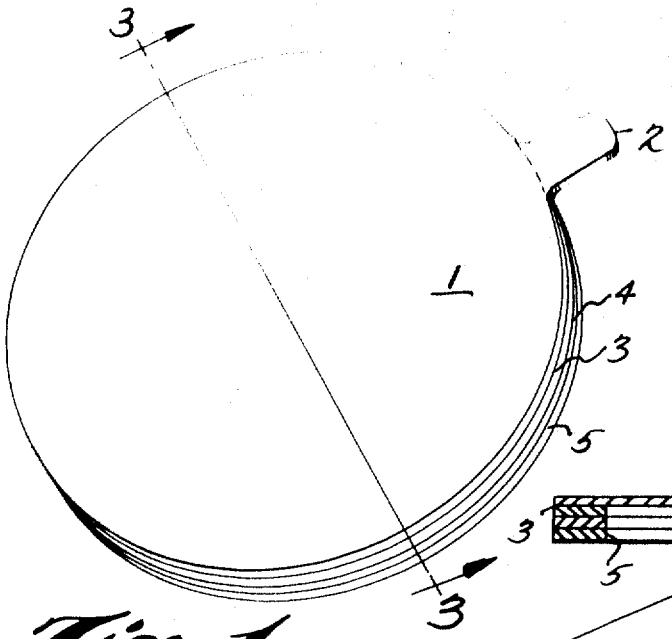
FIGURE 1 is a perspective view of a lid embodying the sealing features of the present invention.
Figure 3:
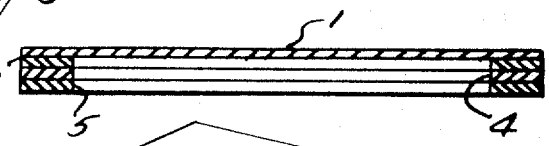
FIGURE 3 is a cross-section of a lid along the lines 3—3 of FIGURE 1.

Referring to FIGURES 1 and 3, the lid comprises a circular board 1 having a tab 2 extending from one side. The board may be paper, printed with labeling information, or it may be transparent plastic to permit inspection of the contents of the package. The undersurface of the board is coated with a layer of pressure sensitive adhesive 3. The coating is in the shape of a narrow ring around the edge of the lid, for sealing to the edge of a cup. One side of a peelable film 4 is adhered to the pressure sensitive adhesive coating, and it is coated on its other surface with a heat seal material 5. The peelable film 4 and the heat seal coating 5, also are ring shaped, and are at least as wide as the pressure sensitive adhesive coating to substantially completely cover it.

The pressure sensitive adhesive may be any available pressure sensitive adhesive mass, its composition not being an element of the present invention. It is well known to those skilled in the art that pressure sensitive adhesive coatings possess a fourfold balance of tackiness, cohesion, elasticity and stretchiness. This balance is achieved for example, in a blend of rubber and a resin, the rubber providing cohesion and elasticity, and the resin providing tackiness and modification of stretchiness and elasticity. It also is known to use certain acrylate polymers in the mass, which inherently possess the necessary fourfold balance of properties. Materials of this type are readily available commercially, and manufacturers will provide information on materials to be used, taking into account the composition of the board 1 and the peelable film 4. Where necessary, a primer coating may be used on the board, under the pressure sensitive adesive, to assure a firm bond, and a backsize coating may e used on the peelable film. It also will be understood iat, where food products are to be packaged, it may be ecessary to take into account the toxicity of materials sed.

The heat seal coating 5 is an optional feature, to be sed only where the peelable film does not readily heat al to the package. Where the package is, say, polythylene or polystyrene, the same material may be used or the peelable film and a heat seal coating may be ecessary.

For convenience in handling, it may be desirable to nploy a peelable film 4 of the same size and shape as ie board 1. *The* [This] inner portion, within the dered ring, may then be separated with a die cutter. If ie pressure sensitive adhesive is coated in a ring, only, s shown, the film will drop out. If the pressure sensitive dhesive is coated over the entire surface of the board, ie inner part of the film will simply lift off with the board hen the package is opened.

Figure 2:
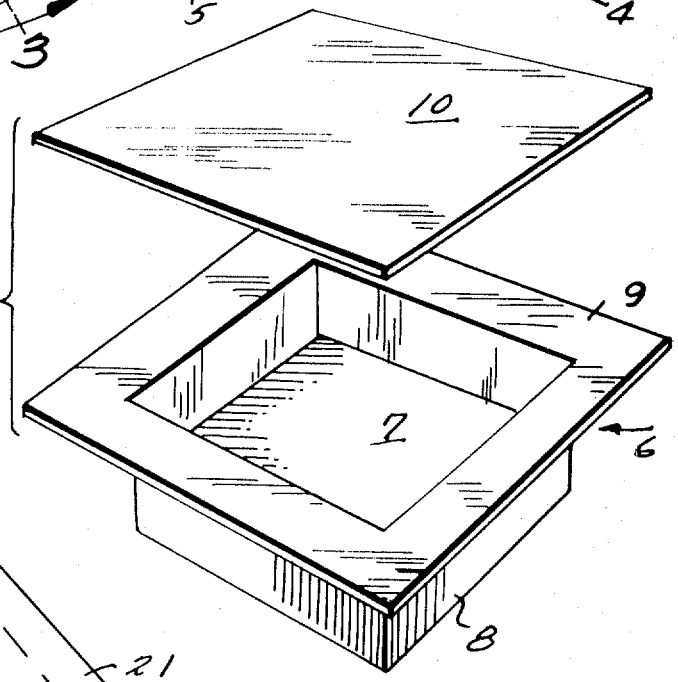
FIGURE 2 is a perspective view of the components of a package which may be sealed in accordance with the invention.
Figure 5:
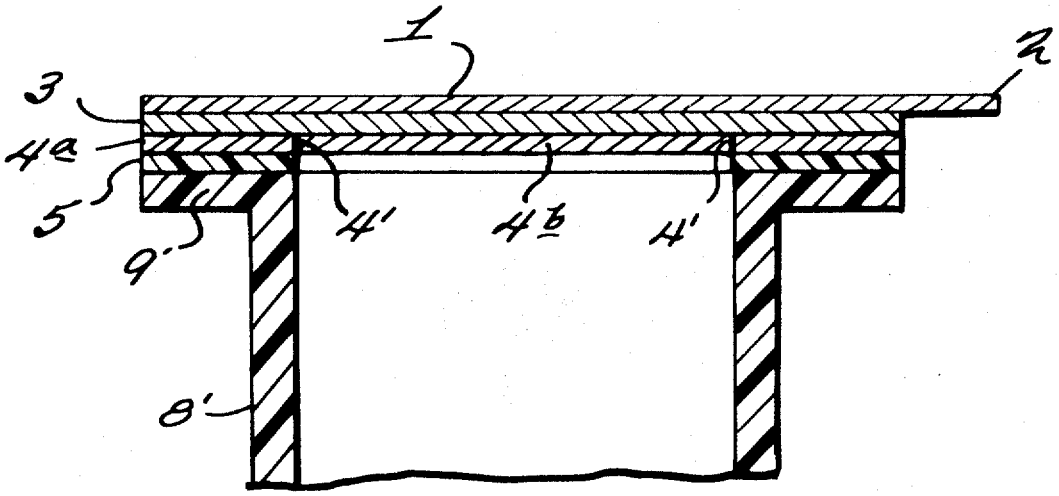
*FIGURE 5 is a cross-sectional view of a receptacle and lid embodying the sealing features of the present invention.*

*This embodiment is illustrated in FIG. 5 wherein a eceptacle 8' which is similar to the receptacle illustrated i FIG. 2 is provided with flange 9' to which a secured portion 4a of a film by means of a heat seal material . Portion 4b is separated from portion 4a by being cut s at 4'. The closure member 1 which is formed with tab 2 is provided on its underside with the pressure ensitive adhesive layer 3 over its entire surface.*

Figure 4:
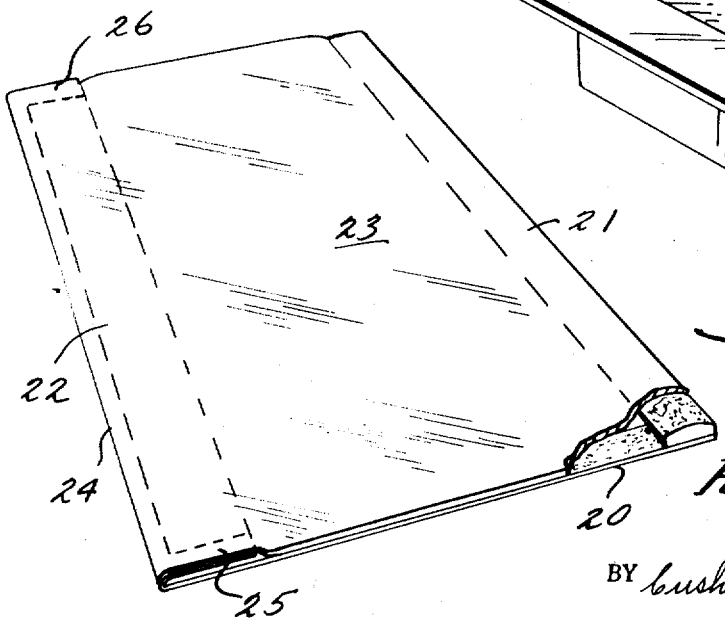
FIGURE 4 is a perspective view of another form of package.

Several types of package may be sealed in accordance ith the invention, for example those shown in FIGURES 2 and 4. The package in FIGURE 2 comprises a up 6 adapted to hold, for example, sliced luncheon ieat. The cup has a bottom 7, sides 8 and a lateral ange 9 extending from the sides. A lid 10 is shown bove the cup, which will overlie the flange 9 when the ackage is closed. The adhesive and heat seal coatings nd the peelable film are not shown in this view of the d, for simplicity, but it will be appreciated that they iay be the same as on the lid shown in FIG. 1.

The package shown in FIGURE 4 is of a size and hape for slices of bacon and illustrates a form of the ivention in which only a part of the closure is resealble, the remainder being permanently sealed. This ackage comprises a rectangular base member 20 which iay be a piece of cardboard. Two edges of the base iember are turned back to overlie the base, as indicated t 21 and 22, the turned over portions being sealed to he base by adhesive at the ends of the package, and this dhesive may be pressure sensitive if desired.

The closure is a piece of flexible transparent plastic lm 23 such as polyethylene. This film, which will be eferred to as the lid, for convenience, is sealed at its dges to the underlying board. However, only a porion of the edge of the lid is sealed to the base 20 with he pressure-sensitive adhesive reclosable construction of he present invention. The other portions of the edges re permanently sealed to the base.

The portions which are permanently sealed are indiated at 24, 25 and 26 and are over the turned over edge 2 of the base. Other portions of the edge are sealed vith pressure sensitive adhesive and a heat seal in the nanner described with respect to the lid in FIGURE 1.

The permanent seal may be achieved, for example, by imply omitting the pressure sensitive adhesive and heat ealing the peelable film to the lid. If necessary, heat eal coatings may be used on both side of the peelable ilm for this purpose.

The package shown in FIGURE 4 is particularly useul when the lid member is a flexible film. Because of he limpness of the film, the purchaser might find it diffiult to replace the lid. However, if the film is only olded back, and is not completely removed, the film vill be replaced more easily. By using this construcion, the customer is not able to peel the lid off completely—without tearing it—and therefore will only fold it back.

It will be appreciated that various materials may be used for the lid and the peelable film, and the other parts of the package, including paper and plastics such as Saran, polyethylene, polypropylene, polystyrene, polyethylene terephthalate (Mylar) etc. Where paper is used, it may be coated with a barrier layer such as Saran, and, if the paper is to be heat sealed, it may require a coating of heat sealable plastic in the heat seal areas.

The permanent seal may be achieved by heating the members to be sealed while they are pressed together. Heating sealing is widely used industry and forms no part of the present invention. Information in temperatures to be used and equipment is readily available. It also is possible to use other types of permanent seal, for example the application of a solvent to plastic surfaces, or the wetting of a water soluble adhesive, through these are less convenient than heating sealing. The invention is applicable to a wide variety of packages. It will appreciated that the concealed pressure sensitive adhesive construction can be used for any type of package closure member. It also will be understood that the pressure sensitive adhesive can be applied to the package itself, rather than the closure, although this construction is somewhat less desirable. That is, it is preferable to have the pressure sensitive adhesive out of the way when the contents of the package are removed. Various other changes may be made in materials, details of construction and mode of operation, without departing from the scope of the invention, as defined in the appended claims.

I claim:

1. A package comprising a receptacle having an opening for receiving and removing a product and a closure member adapted to at least partially close said opening, said closure member having a coating of pressure sensitive adhesive mass on at least a portion of the area thereof which is adjacent said [package] *receptacle*, and a peelable film, overlying said pressure sensitive adhesive, which is permanently sealable to said [package] *receptacle* and from which said closure member can be removed without substantial transfer of pressure sensitive adhesive mass to said film, whereby upon permanently sealing said film to said [package] *receptacle* said closure member may be removed and then resealed to the [package] *receptacle, said peelable film being cut into two portions, both overlying said pressure sensitive adhesive so that, when one of said portions is removed with said closure member, the other portion can remain sealed to said receptacle.*

2. A package comprising a receptacle having an opening for receiving and removing a product and a closure member adapted to at least partially close said opening, said closure member having a coating of pressure sensitive adhesive mass on at least a portion of the area thereof which is adjacent said [package] *receptacle*, and a peelable film, overlying said pressure sensitive adhesive, which is heat sealable to said [package] *receptacle* and from which said closure member can be removed without substantial transfer of pressure sensitive adhesive mass to said film, whereby upon heat sealing said film to said [package] *receptacle* said closure member may be removed and then resealed to the [package] *receptacle, said peelable film being cut into two portions, both overlying said pressure sensitive adhesive so that, when one of said portions is removed with said closure member, the other portion can remain sealed to said receptacle.*

3. A package comprising a receptacle having an opening for receiving and removing a product and a closure member adapted to at least partially close said opening, said closure member having a coating of pressure sensitive adhesive mass on at least a portion of the area thereof which is adjacent said [package] *receptacle*, and a peelable film, overlying said pressure sensitive adhesive, which is permanently sealed to said [package] *receptacle* and from which said closure member can be removed without substantial transfer of pressure sensitive adhesive mass to said film, whereby said closure member may be removed from and resealed to said receptacle, *said peelable film being cut into two portions, both overlying said pressure sensitive adhesive, one of which portions is permanently sealed to said receptacle and the other of which portions is not sealed to said receptacle, so that said other portion is removed with said closure member when the receptacle is opened.*

4. A package comprising a receptacle having an opening for receiving and removing a product and a closure member adapted to at least partially close said opening, said closure member having a coating of pressure sensitive adhesive mass on at least a portion of the area thereof which is adjacent said [package] *receptacle,* and a peelable film, overlying said pressure sensitive adhesive, which is heat sealed to said [package] *receptacle* and from which said closure member can be removed without substantial transfer of pressure sensitive adhesive mass to said film, whereby said closure member may be removed from and resealed to said receptacle, *said peelable film being cut into two portions, both overlying said pressure sensitive adhesive, one of which portions is permanently sealed to said receptacle and the other of which portions is not sealed to said receptacle, so that said other portion is removed with said closure member when the receptacle is opened.*

[5. A package as set forth in claim 4 in which a portion of the area of said closure member adjacent said receptacle is permanently sealed to the receptacle, so that on removing the closure member from said peelable film, the closure member remains attached to the receptacle.]

[6. A method of closing a package which comprises a receptacle having an opening for receiving and removing a product and a closure member which at least partially closes said opening, said closure member having a coating of pressure sensitive adhesive mass on at least part of the area thereof which is adjacent said package, and a peelable film, overlying said pressure sensitive adhesive, which is heat sealable to said package, and from which said closure member can be removed without substantial transfer of pressure sensitive adhesive mass to said film, said method comprising placing said closure member against said receptacle and then heating said receptacle and said peelable film to heat seal said peelable film to said receptacle.]

7. A package closure comprising a closure member adapted to at least partially close an opening into a package, a layer of pressure sensitive adhesive mass on said closure member in an area thereof which is adjacent said package, and a peelable film, overlying said pressure sensitive adhesive, which is permanently sealable to said package and from which said closure member can be removed without substantial transfer of pressure sensitive adhesive mass to said film, whereby, upon permanently sealing said film to the package the closure member may be removed and then resealed to the package, *said peelable film being cut into two portions, both overlying said pressure sensitive adhesive so that, when one of said portions is removed with said closure member the other portion can remain sealed to said package.*

8. A package closure comprising a closure member adapted to at least partially close an opening into a package, a layer of pressure sensitive adhesive mass on said closure member in an area thereof which is adjacent said package, and a peelable film, overlying said pressure sensitive adhesive, which is heat sealable to said package and from which said closure member can be removed without substantial transfer of pressure sensitive adhesive mass to said film, *said peelable film being cut into two portions, both overlying said pressure sensitive adhesive so that, when one of said portions is removed with said closure member, the other portion can remain sealed to said package.*

9. A package closure as set forth in claim 8 including a coating of heat sealable plastic on said peelable film to render said peelable film heat sealable to said package.

References Cited

The following references, cited by the Examiner, are of record in the patented file of this patent or the original patent.

UNITED STATES PATENTS

| | | | |
|---|---|---|---|
| 2,719,663 | 10/1955 | Meyer-Jagenberg | 229—7 R |
| 3,079,057 | 2/1963 | Colarusso | 229—43 X |
| 3,202,271 | 8/1965 | Kirk | 206—56 AA |
| 2,271,279 | 1/1942 | Thomas. | |
| 2,805,183 | 9/1957 | Higgins. | |
| 2,874,836 | 2/1959 | Wertepny | 206—78 |
| 3,049,224 | 8/1962 | Fredette | 206—42 |
| 3,149,771 | 9/1964 | Rearl. | |

FOREIGN PATENTS

| | | |
|---|---|---|
| 931,826 | 7/1963 | Great Britain. |

DONALD F. NORTON, Primary Examiner

U.S. Cl. X.R.

229—51 SC